US012326762B2

(12) United States Patent
Lu

(10) Patent No.: US 12,326,762 B2
(45) Date of Patent: Jun. 10, 2025

(54) FLIP FUNCTION ASSEMBLY AND ELECTRONIC DEVICE

(71) Applicant: VIVO MOBILE COMMUNICATION CO., LTD., Dongguan (CN)

(72) Inventor: Chaoyang Lu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 287 days.

(21) Appl. No.: 17/946,604

(22) Filed: Sep. 16, 2022

(65) Prior Publication Data

US 2023/0011523 A1      Jan. 12, 2023

Related U.S. Application Data

(63) Continuation of application No. PCT/CN2021/080819, filed on Mar. 15, 2021.

(30) Foreign Application Priority Data

Mar. 18, 2020   (CN) .......................... 202010191136.0

(51) Int. Cl.
*G06F 1/16*        (2006.01)
(52) U.S. Cl.
CPC .......... *G06F 1/1681* (2013.01); *G06F 1/1641* (2013.01); *G06F 1/1677* (2013.01); *G06F 1/1686* (2013.01)
(58) Field of Classification Search
CPC .... G06F 1/1681; G06F 1/1641; G06F 1/1677; G06F 1/1686; G06F 1/1626; G06F 1/1675; H04M 2250/20; F16H 37/124
See application file for complete search history.

(56) References Cited

U.S. PATENT DOCUMENTS

| 7,800,648 B2 * | 9/2010 | Lu ........................ H04N 23/51 |
| | | 348/207.1 |
| 10,419,589 B2 * | 9/2019 | Fan ..................... H04M 1/0266 |
| 10,498,869 B2 * | 12/2019 | Zeng ................... H04M 1/0235 |

(Continued)

FOREIGN PATENT DOCUMENTS

| CN | 105905046 A | 8/2016 |
| CN | 108989509 A | 12/2018 |

(Continued)

*Primary Examiner* — Anthony M Haughton
*Assistant Examiner* — Theron S Milliser
(74) *Attorney, Agent, or Firm* — The Webb Law Firm

(57) ABSTRACT

A flip function assembly, applied to an electronic device, where the electronic device includes an installation base, and the flip function assembly includes a driving mechanism, a connecting rod transmission mechanism, and a functional module, where the driving mechanism includes a first driving component, and the connecting rod transmission mechanism includes a first connecting rod and a second connecting rod, where a first end of the first connecting rod is connected to the first driving component, and a second end of the first connecting rod is hinged to the functional module, a first end of the second connecting rod is hinged to an installation base, a second end of the second connecting rod is hinged to the functional module, and the first driving component drives the first connecting rod to move, so that the second connecting rod drives the functional module to rotate.

17 Claims, 3 Drawing Sheets

(56) References Cited

U.S. PATENT DOCUMENTS

| | | | |
|---|---|---|---|
| 10,656,680 B2* | 5/2020 | Fan | H04M 1/0264 |
| 10,686,971 B1* | 6/2020 | Yoo | H04M 1/0237 |
| 10,880,420 B2* | 12/2020 | Yang | H04N 23/50 |
| 10,897,526 B2* | 1/2021 | Fan | H04M 1/0237 |
| 11,006,024 B2* | 5/2021 | Han | H04N 23/50 |
| 11,089,226 B2* | 8/2021 | Liu | H04N 23/50 |
| 11,140,249 B2* | 10/2021 | Chen | H04M 1/0264 |
| 11,405,496 B2* | 8/2022 | Ha | H04M 1/0264 |
| 11,463,567 B2* | 10/2022 | Choi | H04M 1/0264 |
| 11,470,191 B2* | 10/2022 | Choi | H04N 23/51 |
| 11,553,069 B2* | 1/2023 | Han | G06F 1/1605 |
| 2008/0012944 A1* | 1/2008 | Lu | H04N 23/51 |
| | | | 348/E5.026 |
| 2009/0231484 A1 | 9/2009 | Lee et al. | |
| 2019/0124186 A1* | 4/2019 | Zeng | H04M 1/0235 |
| 2019/0250667 A1* | 8/2019 | Fan | H04M 1/0237 |
| 2019/0253542 A1* | 8/2019 | Fan | H04M 1/0237 |
| 2019/0253543 A1* | 8/2019 | Fan | H04M 1/0266 |
| 2020/0154005 A1* | 5/2020 | Han | F16M 11/105 |
| 2020/0177773 A1* | 6/2020 | Yoo | H04M 1/0264 |
| 2020/0213491 A1 | 7/2020 | Huang et al. | |
| 2020/0329130 A1* | 10/2020 | Choi | G02B 7/023 |
| 2020/0329131 A1* | 10/2020 | Han | H04N 23/50 |
| 2020/0344338 A1* | 10/2020 | Yang | H04M 1/0254 |
| 2021/0006646 A1* | 1/2021 | Ha | H04M 1/0237 |
| 2021/0014346 A1* | 1/2021 | Choi | H04M 1/0277 |
| 2023/0011523 A1* | 1/2023 | Lu | G06F 1/1681 |

FOREIGN PATENT DOCUMENTS

| | | |
|---|---|---|
| CN | 109862145 A | 6/2019 |
| CN | 109873938 A | 6/2019 |
| CN | 110099200 A | 8/2019 |
| CN | 110166664 A | 8/2019 |
| CN | 110198367 A | 9/2019 |
| CN | 110673656 A | 1/2020 |
| CN | 111427419 A | 7/2020 |
| JP | 2000171845 A | 6/2000 |
| JP | 2003125050 A | 4/2003 |
| JP | 2010155484 A | 7/2010 |
| JP | 201127185 A | 2/2011 |
| WO | 2019015651 A1 | 1/2019 |

* cited by examiner

FLIP FUNCTION ASSEMBLY AND ELECTRONIC DEVICE

CROSS-REFERENCE TO RELATED APPLICATIONS

This application is a Bypass Continuation Application of PCT/CN2021/080819 filed on Mar. 15, 2021, which claims priority to Chinese Patent Application No. 202010191136.0 filed Mar. 18, 2020, the disclosures of which are hereby incorporated by reference in their entirety.

BACKGROUND OF THE INVENTION

Field of the Invention

The application relates to the field of communications technologies, and in particular to a flip function assembly and an electronic device.

Description of Related Art

With the advancement of technologies and the development of electronic devices, an electronic device includes an increasing number of functional modules. However, a position of a functional module in the electronic device is usually fixed and cannot be rotated during use, which provides bad experience to a user.

Taking a camera module as an example, a user usually holds the electronic device to shoot an image. Because a user's hand trembles while the user holds the electronic device, and the camera module is in a fixed position relative to the electronic device, hand trembling will cause the camera module to incline. The inclination will cause a change in a viewing angle of a lens, thereby resulting in poor quality of an image shot by the camera module.

Definitely, the foregoing problem exists in not only the camera module, but also other functional modules.

SUMMARY OF THE INVENTION

A flip function assembly, applied to an electronic device, where the electronic device includes an installation base, and the flip function assembly includes a driving mechanism, a connecting rod transmission mechanism, and a functional module, where the driving mechanism includes a first driving component, and the connecting rod transmission mechanism includes a first connecting rod and a second connecting rod, where a first end of the first connecting rod is connected to the first driving component, a second end of the first connecting rod is hinged to the functional module, and a hinge point between the second end of the first connecting rod and the functional module is a first hinge point, a first end of the second connecting rod is hinged to the installation base, and a hinge point between the first end of the second connecting rod and the installation base is a second hinge point, a second end of the second connecting rod is hinged to the functional module, and a hinge point between the second end of the second connecting rod and the functional module is a third hinge point; and the first driving component drives the first connecting rod to move, so that the second connecting rod drives the functional module to rotate.

An electronic device, including the foregoing flip function assembly.

BRIEF DESCRIPTION OF DRAWINGS

The accompanying drawings described herein are used to provide further understanding of the application and constitute a part of the application. The exemplary embodiments of the application and descriptions thereof are used to explain the application, and do not constitute an undue limitation on the application. In the accompanying drawings.

Figure 1:
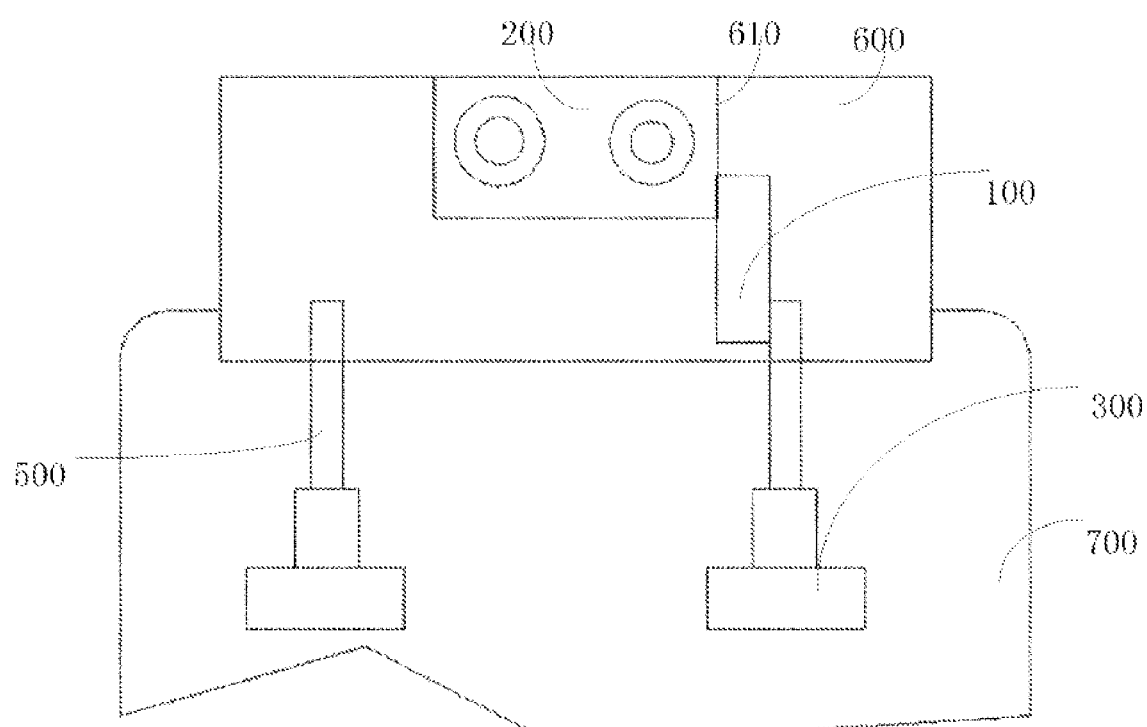
FIG. 1 and FIG. 2 are schematic diagrams of partial structures of an electronic device disclosed according to embodiments of the application, respectively.
Figure 2:
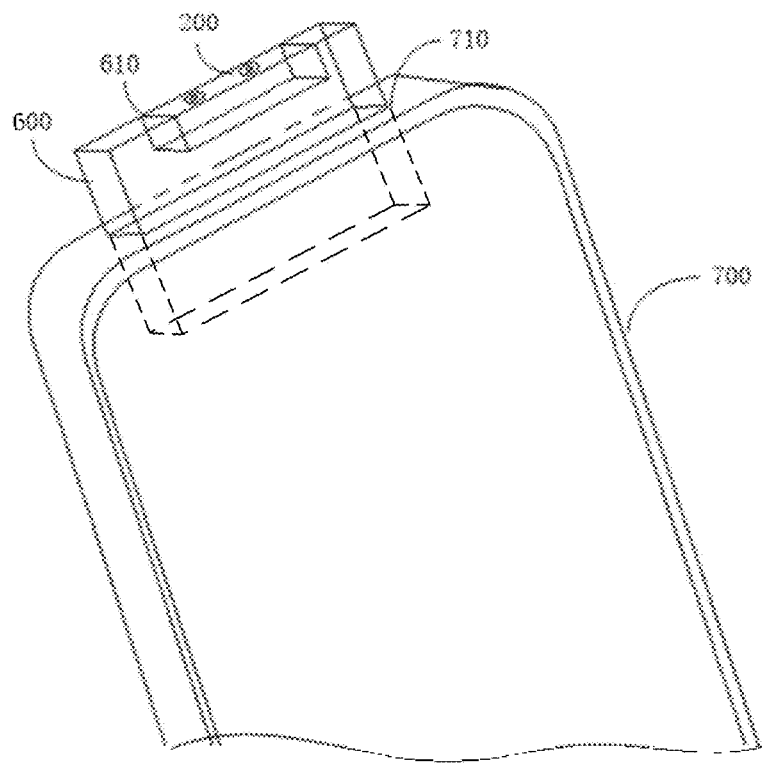
Figure 3:
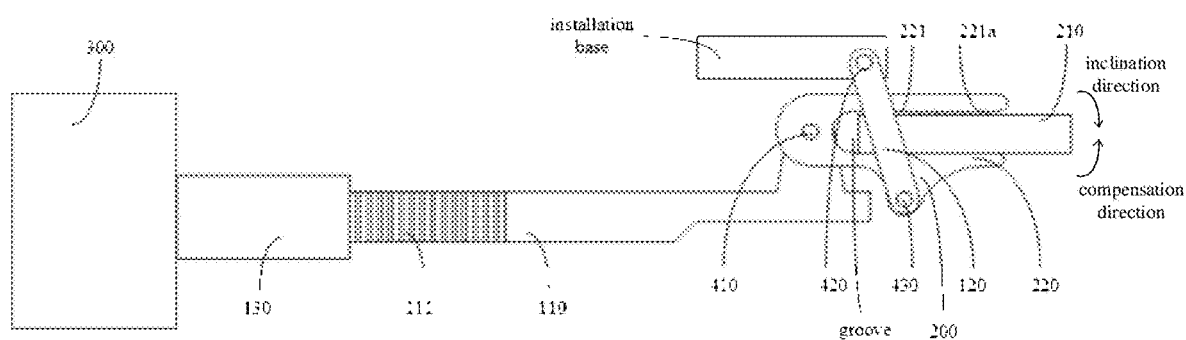
FIG. 3 and FIG. 4 are schematic structural diagrams of a flip function assembly in different statuses of the electronic device disclosed according to embodiments of the application, respectively.
Figure 4:
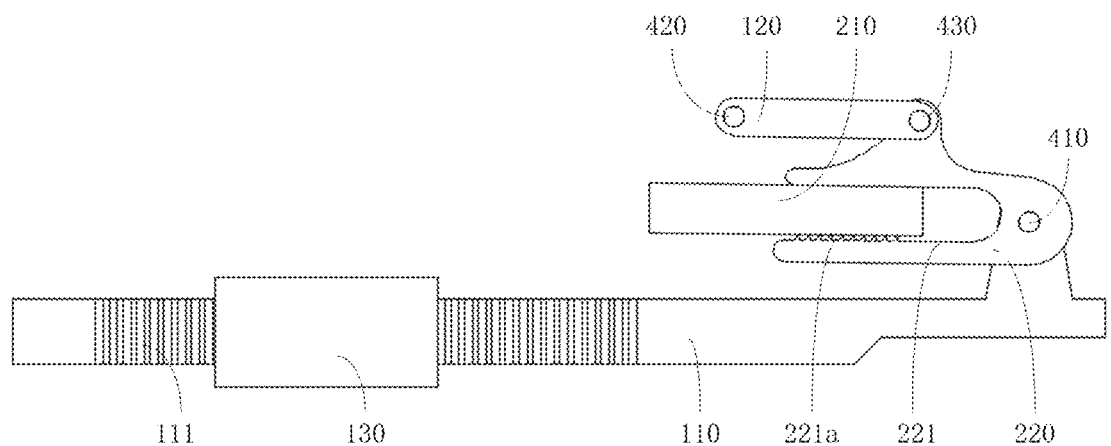

Reference numerals in the accompanying drawings are as follows:
- 100—Connecting rod transmission mechanism, 110—First connecting rod, 111—Threaded segment, 120—Second connecting rod, 130—Threaded bushing;
- 200—Functional module, 210—Module body, 220—Clamping portion, 221—Clamping surface, 221a—Tooth-shaped protrusion;
- 300—First driving component;
- 410—First hinge point, 420—Second hinge point, and 430—Third hinge point;
- 500—Second driving component;
- 600—Installation support, 610—Avoidance groove;
- 700—Housing, 710—Opening.

DESCRIPTION OF THE INVENTION

To make the objects, technical solutions, and advantages of the application clearer, the following clearly describes the technical solutions of the application with reference to specific embodiments of the application and corresponding accompanying drawings. Apparently, the described embodiments are merely a part rather than all of the embodiments of the application. Based on the embodiments of the application, all other embodiments obtained by a person of ordinary skill in the art fall within the protection scope of the application.

The technical solutions disclosed by various embodiments of the application are described in detail below with reference to the accompanying drawings.

As shown in FIG. 1 to FIG. 4, embodiments of the application disclose a flip function assembly, which is applied to an electronic device. The disclosed flip function assembly includes a driving mechanism, a connecting rod transmission mechanism 100, and a functional module 200. The internal space which includes and accommodates the functional module (200) when the functional module is retracted into the housing The functional module may be located within the internal space.

The driving mechanism includes a first driving component 300, and the first driving component 300 may be a stepping motor. The connecting rod transmission mechanism 100 includes a first connecting rod 110 and a second connecting rod 120. A first end of the first connecting rod 110 is connected to the first driving component 300, and the first driving component 300 can drive the first connecting rod 110 to move. A second end of the first connecting rod 110 is hinged to the functional module 200. In a case that the flip function assembly is installed on the electronic device, the electronic device includes an installation base, a first end of the second connecting rod 120 is hinged to the installation base, and a second end of the second connecting rod 120 is hinged to the functional module 200. The installation base may be a housing 700 of the electronic device, or may be a telescopic module movably disposed on the housing 700, which is not limited in this embodiment of the application.

A hinge point between the second end of the first connecting rod 110 and the functional module 200 is a first hinge point 410. A hinge point between the first end of the second connecting rod 120 and the installation base is a second hinge point 420. A hinge point between the second end of the second connecting rod 120 and the functional module 200 is a third hinge point 430. The first hinge point 410, the second hinge point 420, and the third hinge point 430 are arranged at intervals. In this case, when the first driving component 300 drives the first connecting rod 110 to move, the first connecting rod 110 pushes the functional module 200 to move. In addition, because the functional module 200 is hinged to the second end of the second connecting rod 120, the functional module 200 pushes the second connecting rod 120 to rotate around the second hinge point 420. Correspondingly, the functional module 200 is also pulled by the second connecting rod 120 during movement, so that the functional module 200 can rotate around the first hinge point 410 under the action of a pulling force, and then the functional module 200 can be flipped.

It can be known from this that, in the flip function assembly disclosed in an embodiment of the application, while the first driving component 300 pushes the functional module 200 to move, the first connecting rod 110 and the second connecting rod 120 cooperate to enable the functional module 200 to rotate, so that the functional module 200 can be flipped. In this manner, the functional module 200 can be rotated to different angles for working, so as to implement rotation of the functional module 200, thereby improving user experience.

Definitely, the functional module 200 may include at least one of a camera module, a card tray, a light supplementing module, a fingerprint recognizing module, a USB interface, or a telephone receiver. Optionally, the functional module 200 may be a camera module. In this case, the camera module only needs to be provided with one camera. The camera module can be flipped during working, so that the camera can be used as a front camera of the electronic device, and can be also used as a rear camera of the electronic device, thereby not only providing relatively good shooting experience to the user, but also saving manufacturing costs for the electronic device.

Optionally, in a case that the functional module 200 is the camera module, during actual use, a user's hand may tremble while the user holds the electronic device for shooting. Based on this, in the embodiments disclosed in the application, the flip function assembly may further include an angle detector and a control apparatus. The angle detector (such as a gyroscope) can detect an inclination angle and an inclination direction of the camera module due to trembling during shooting, and feed back the inclination angle and inclination direction to the control apparatus. The control apparatus may be a CPU (Central Processing Unit), the control apparatus determines a compensation angle and compensation direction according to the inclination direction and inclination angle of the camera module, and controls the first driving component 300 to drive the camera module to rotate at the compensation angle along the compensation direction. It should be noted that the compensation angle is equal to the inclination angle, and the compensation direction is opposite to the inclination direction.

In this case, while the camera module shoots an image, when the camera module is inclined due to trembling of a user's hand or another reason, the angle detector can detect an inclination angle generated by the camera module. Optionally, the control apparatus controls, according to the inclination angle generated by the camera module, the first driving component 300 to move, so that the camera module rotates along a direction opposite to the inclination direction during shooting, and then the camera module can be returned to an original working position. Finally, a shooting process of the camera module is not easily affected by trembling of the user's hand or another reason, thereby improving shooting experience of the user.

In an embodiment of the application, the connecting rod transmission mechanism 100 may be directly connected to a module body 210 of the functional module 200, so that the module body 210 can be flipped. Definitely, optionally, the functional module 200 may further include a clamping portion 220, the module body 210 may be fixed to the clamping portion 220, and the second end of the first connecting rod 110 may be hinged to the clamping portion 220. A hinge point between the second end of the first connecting rod 110 and the clamping portion 220 may be the first hinge point 410, the second end of the second connecting rod 120 may be hinged to the clamping portion 220, and a hinge point between the second end of the second connecting rod 120 and the clamping portion 220 may be the third hinge point 430. In this case, the first driving component 300 and the connecting rod transmission mechanism 100 can drive the clamping portion 220 to flip, so that the clamping portion 220 drives the module body 210 to flip, and finally implementing flipping of the functional module 200.

Compared with that the connecting rod transmission mechanism 100 is directly connected to the module body 210 of the functional module 200, in this manner, there is no need to dispose a corresponding connection mechanism on the module body 210, so that the module body 210 is relatively complete. In addition, different types of module bodies 210 can be disposed on the clamping portion 220, so that the flip function assembly has a better function.

Optionally, the clamping portion 220 may have a groove. The groove may include two opposite clamping surfaces 221, and clamping space is formed between the two opposite clamping surfaces 221. In an assembly process, at least a part of the module body 210 may be disposed between the two clamping surfaces 221. That is, at least a part of the module body 210 may be in the clamping space. The clamping portion 220 of this structure not only facilitates processing and forming, but also has better reliability, thereby enabling connection between the functional module 200 and the connecting rod transmission mechanism 100 to be firmer.

Optionally, to prevent the module body 210 from being inclined in the clamping portion 220, thereby affecting normal working of the module body 210, in an optional solution, the clamping portion 220 may be an elastic piece, and the module body 210 may be elastically clamped between the two clamping surfaces 221, so that at least a part of the module body 210 can be stably located between the two clamping surfaces 221 under the action of an elastic force, so as to prevent the module body 210 from being inclined during working.

In another optional solution, at least one clamping surface 221 may be provided with a tooth-shaped protrusion 221a.

One of the clamping surfaces 221 may be provided with the tooth-shaped protrusion 221a; or both clamping surfaces 221 may be provided with the tooth-shaped protrusion 221a, and at least a part of the module body 210 may be detachably disposed between the two clamping surfaces 221 through the tooth-shaped protrusion 221a. In this case, because the tooth-shaped protrusion 221a can better contact at least a part of an outer surface of the module body 210, the module body 210 can be stably fixed between the two clamping surfaces 221 to prevent the module body 210 from being inclined during working. The module body 210 is detachably disposed between the two clamping surfaces 221, which facilitates replacement of different types of module bodies 210, and the functional module 200 is not required to be dismantled entirely, which can undoubtedly reduce assembly and disassembly procedures.

In the flip function assembly disclosed in an embodiment of the application, the first driving component 300 may have multiple types. For example, the first driving component 300 may be a linear motor, and the first driving component 300 may also be a rotary motor. Optionally, the first driving component 300 may be the rotary motor. Correspondingly, the connecting rod transmission mechanism 100 may further include a threaded bushing 130, and the first end of the first connecting rod 110 may include a threaded segment 111. The threaded bushing 130 may be sleeved on the threaded segment 111, the threaded bushing 130 may be meshed with the threaded segment 111, and the rotary motor may be connected to the threaded bushing 130. In this case, the rotary motor can drive the threaded bushing 130 to rotate. Since the threaded bushing 130 is meshed with the threaded segment 111, the threaded bushing 130 can drive, while rotating, the first connecting rod 110 to move, and finally the functional module 200 can be driven, through the moving first connecting rod 110, to rotate.

Compared with driving by the linear motor, in this manner, the connecting rod transmission mechanism 100 can be driven more accurately to move, so that the functional module 200 can be flipped relatively accurately, and advantages of long life and high efficiency are provided in this manner.

Correspondingly, in a case that the first driving component 300 is the rotary motor, the connecting rod transmission mechanism 100 may include a gear, the first end of the first connecting rod 110 may include a rack segment, the rotary motor may be connected to the gear, and the gear may be meshed with the rack segment. The rotary motor can drive the gear to rotate. Since the gear is meshed with the rack segment, a rotating gear can drive the first connecting rod 110 to move, and finally the functional module 200 can be driven, through the moving first connecting rod 110, to rotate. In this manner, not only can the functional module 200 be flipped more accurately, but also a structure of the flip function assembly can be relatively compact.

Based on the flip function assembly disclosed in the embodiment of the application, an embodiment of the application further discloses an electronic device, and the disclosed electronic device includes the flip function assembly described in any one of the foregoing embodiments.

Optionally, the flip function assembly can be installed on the electronic device in multiple manners. Optionally, the electronic device may include an installation support 600 disposed on the housing 700. The installation support 600 may be the foregoing installation base, and the flip function assembly may be disposed on the installation support 600. The installation support 600 can provide an installation position for the flip function assembly, so that a structure of the electronic device can be relatively compact. In this case, during assembly, the flip function assembly may be installed on the installation support 600 first, and then both the flip function assembly and the installation support 600 may be entirely installed on the housing 700 of the electronic device.

Optionally, the installation support 600 may be movably disposed on the housing 700. In this case, the driving mechanism may further include a second driving component 500. The housing 700 may have an inner cavity and an opening 710 communicating with the inner cavity. The second driving component 500 may be connected to the installation support 600, and the second driving component 500 can drive the installation support 600 to move, so that at least a part of the functional module 200 can extend out of the housing 700 through the opening 710 along with the installation support 600, or the functional module 200 can be retracted into housing 700 through the opening 710 along with the installation support 600. In this case, when the functional module 200 needs to work, the functional module 200 can extend out of the housing 700 through the opening 710 along with movement of the installation support 600 for working, thereby improving flexibility of the functional module 200; and after the functional module 200 completes work, the functional module 200 can be retracted into the housing 700 through the opening 710 along with the movement of the installation support 600, thereby providing waterproof and dustproof effects for the functional module 200 and other members of the flip functional component.

Optionally, referring to FIG. 1, to facilitate flipping of the functional module 200, an avoidance groove 610 may be disposed at the installation support 600. In this case, the functional module 200 can be flipped in the avoidance groove 610, so that the functional module 200 can be flipped more easily. In addition, in a case that the functional module 200 is at least partially outside the housing 700, the avoidance groove 610 also enables the functional module 200 to be at least partially outside the installation support 600, thereby facilitating the functional module 200 to work.

The electronic device disclosed in the embodiments of the application may be a smart phone, a tablet computer, an e-book reader, a wearable device, and the like. Definitely, the electronic device may also be other devices, and the embodiments of the application do not limit types of the electronic device.

Figure 5:
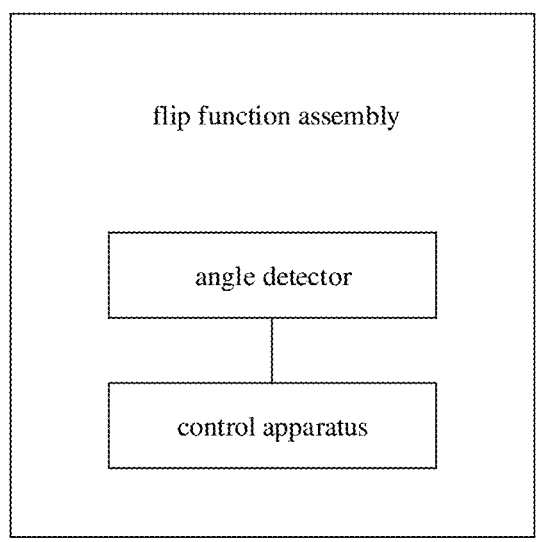
FIG. 5 is a schematic structural diagram of an angle detector and control apparatus disclosed according to embodiments of the application, respectively.
Figure 6:
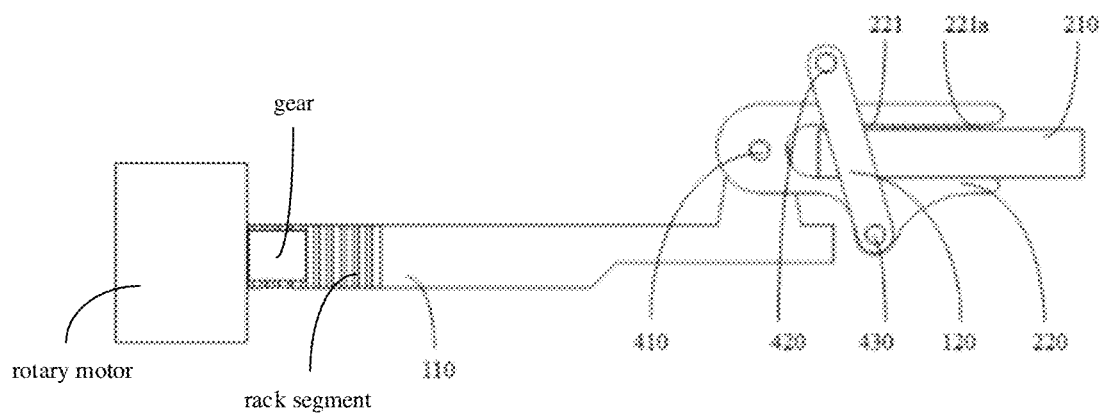
FIG. 6 is a schematic structural diagram of a gear and the rack segment device disclosed according to embodiments of the application, respectively.

FIG. 5 shows an angle detector and control apparatus, respectively. FIG. 6 shows a schematic structural diagram comprising a gear and the rack segment device, respectively.

The foregoing descriptions are merely embodiments of the application, and are not intended to limit the application. For a person skilled in the art, various changes and variations may be made in the application. Any modifications, equivalent substitutions, improvements, and the like made within the spirit and principle of the application should be included within the scope of the claims of the application.

What is claimed is:

1. A flip function assembly, applied to an electronic device,
wherein the electronic device comprises an installation base, and the flip function assembly comprises a driving mechanism, a connecting rod transmission mechanism, and a functional module, wherein the driving mechanism comprises a first driving component, and the connecting rod transmission mechanism comprises a first connecting rod and a second connecting rod, wherein a first end of the first connecting rod is connected to the first driving component, a second end of the first connecting rod is hinged to the functional module, and a hinge point between the second end of the first connecting rod and the functional module is a first hinge point, a first end of the second connecting rod is hinged to the installation base, a hinge point between the first end of the second connecting rod and the installation base is a second hinge point, a second end of the second connecting rod is hinged to the functional module, and a hinge point between the second end of the second connecting rod and the functional module is a third hinge point; and the first driving component drives the first connecting rod to move, so that the second connecting rod drives the functional module to rotate, and wherein the first end of the first connecting rod and the second end of the first connecting rod are opposite ends on the first connecting rod.

2. The flip function assembly according to claim 1, wherein the functional module is a camera module.

3. The flip function assembly according to claim 2, wherein the flip function assembly further comprises an angle detector and a control apparatus, wherein the angle detector detects an inclination angle and an inclination direction of the camera module during shooting, and the control apparatus controls the first driving component, so that the first driving component drives the camera module to rotate at a compensation angle along a compensation direction, wherein the compensation angle is equal to the inclination angle, and the compensation direction is opposite to the inclination direction.

4. The flip function assembly according to claim 1, wherein the functional module comprises a module body and a clamping component, wherein the module body is fixed to the clamping component, the second end of the first connecting rod is hinged to the clamping portion, a hinge point between the second end of the first connecting rod and the clamping component is the first hinge point, the second end of the second connecting rod is hinged to the clamping component, and a hinge point between the second end of the second connecting rod and the clamping component is the third hinge point.

5. The flip function assembly according to claim 4, wherein the clamping component has a groove, the groove comprises two opposite clamping surfaces, and at least a portion of the module body is disposed between the two clamping surfaces.

6. The flip function assembly according to claim 5, wherein a tooth-shaped protrusion is disposed on at least one of clamping surfaces, and at least a portion of the module body is detachably disposed between the two clamping surfaces through the tooth-shaped protrusion.

7. The flip function assembly according to claim 1, wherein the first driving component is a rotary motor, the connecting rod transmission mechanism further comprises a threaded bushing, the first end of the first connecting rod comprises a threaded segment, the threaded bushing is sleeved on the threaded segment, the rotary motor is connected to the threaded bushing, and the rotary motor drives the threaded bushing to rotate, so that the first connecting rod moves.

8. The flip function assembly according to claim 1, wherein the first driving component is a rotary motor, the connecting rod transmission mechanism comprises a gear, the first end of the first connecting rod comprises a rack segment, wherein the rotary motor is connected to the gear, the gear is meshed with the rack segment, and the rotary motor drives the gear to rotate, so that the first connecting rod moves.

9. An electronic device, comprising a flip function assembly, which is applied to the electronic device, wherein the electronic device comprises an installation base, and the flip function assembly comprises a driving mechanism, a connecting rod transmission mechanism, and a functional module, wherein the driving mechanism comprises a first driving component, and the connecting rod transmission mechanism comprises a first connecting rod and a second connecting rod, wherein a first end of the first connecting rod is connected to the first driving component, a second end of the first connecting rod is hinged to the functional module, and a hinge point between the second end of the first connecting rod and the functional module is a first hinge point, a first end of the second connecting rod is hinged to the installation base, a hinge point between the first end of the second connecting rod and the installation base is a second hinge point, a second end of the second connecting rod is hinged to the functional module, and a hinge point between the second end of the second connecting rod and the functional module is a third hinge point; and the first driving component drives the first connecting rod to move, so that the second connecting rod drives the functional module to rotate, and wherein the first end of the first connecting rod and the second end of the first connecting rod are opposite ends on the first connecting rod.

10. The electronic device according to claim 9, wherein the electronic device comprises a housing and an installation support movably disposed on the housing, wherein the installation support is the installation base, the driving mechanism further comprises a second driving component, and the housing has an inner cavity and an opening communicating with the inner cavity, wherein the second driving component is connected to the installation support, the flip function assembly is disposed at the installation support, the second driving component drives the installation support to move, the functional module is retracted into the housing through the opening along with the installation support or at least a portion of the functional module extends out of the housing.

11. The electronic device according to claim 9, wherein the functional module is a camera module.

12. The electronic device according to claim 11, wherein the flip function assembly further comprises an angle detector and a control apparatus, wherein the angle detector detects an inclination angle and an inclination direction of the camera module during shooting, and the control apparatus controls the first driving component, so that the first driving component drives the camera module to rotate at a compensation angle along a compensation direction, wherein the compensation angle is equal to the inclination angle, and the compensation direction is opposite to the inclination direction.

13. The electronic device according to claim 9, wherein the functional module comprises a module body and a clamping component, wherein the module body is fixed to the clamping component, the second end of the first connecting rod is hinged to the clamping portion, a hinge point between the second end of the first connecting rod and the clamping component is the first hinge point, the second end of the second connecting rod is hinged to the clamping component, and a hinge point between the second end of the second connecting rod and the clamping component is the third hinge point.

14. The electronic device according to claim 13, wherein the clamping component has a groove, the groove comprises two opposite clamping surfaces, and at least a portion of the module body is disposed between the two clamping surfaces.

15. The electronic device according to claim 14, wherein a tooth-shaped protrusion is disposed on at least one of clamping surfaces, and at least a portion of the module body is detachably disposed between the two clamping surfaces through the tooth-shaped protrusion.

16. The electronic device according to claim 9, wherein the first driving component is a rotary motor, the connecting rod transmission mechanism further comprises a threaded bushing, the first end of the first connecting rod comprises a threaded segment, the threaded bushing is sleeved on the threaded segment, the rotary motor is connected to the threaded bushing, and the rotary motor drives the threaded bushing to rotate, so that the first connecting rod moves.

17. The electronic device according to claim 9, wherein the first driving component is a rotary motor, the connecting rod transmission mechanism comprises a gear, the first end of the first connecting rod comprises a rack segment, wherein the rotary motor is connected to the gear, the gear is meshed with the rack segment, and the rotary motor drives the gear to rotate, so that the first connecting rod moves.

* * * * *